United States Patent
Scott et al.

(10) Patent No.: US 10,007,522 B2
(45) Date of Patent: Jun. 26, 2018

(54) SYSTEM AND METHOD FOR SELECTIVELY ALLOCATING ENTRIES AT A BRANCH TARGET BUFFER

(71) Applicants: Jeffrey W. Scott, Austin, TX (US); William C. Moyer, Dripping Springs, TX (US)

(72) Inventors: Jeffrey W. Scott, Austin, TX (US); William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 367 days.

(21) Appl. No.: 14/282,290

(22) Filed: May 20, 2014

(65) Prior Publication Data

US 2015/0339124 A1   Nov. 26, 2015

(51) Int. Cl.
  *G06F 9/32*   (2006.01)
  *G06F 9/42*   (2006.01)
  *G06F 9/38*   (2018.01)

(52) U.S. Cl.
  CPC .......... *G06F 9/3806* (2013.01); *G06F 9/3808* (2013.01); *G06F 9/3844* (2013.01)

(58) Field of Classification Search
  CPC ...... G06F 9/3806; G06F 9/30; G06F 9/30058; G06F 9/38; G06F 9/3844; G06F 9/3808; G06F 2212/6024; G06F 12/121
  USPC ........................... 712/238–240; 711/133–136
  See application file for complete search history.

(56) References Cited

U.S. PATENT DOCUMENTS

| | | | | |
|---|---|---|---|---|
| 5,442,756 A | * | 8/1995 | Grochowski | G06F 9/30192 712/23 |
| 5,822,576 A | * | 10/1998 | Dinkjian | G06F 9/3844 712/239 |
| 5,867,698 A | * | 2/1999 | Cumming | G06F 9/3806 711/129 |
| 6,314,493 B1 | * | 11/2001 | Luick | G06F 9/3804 711/137 |
| 7,895,422 B2 | | 2/2011 | Moyer et al. | |
| 7,937,573 B2 | | 5/2011 | Moyer et al. | |
| 2002/0199091 A1 | * | 12/2002 | Tago | G06F 9/3848 712/240 |
| 2008/0229052 A1 | * | 9/2008 | Ozer | G06F 12/126 711/202 |
| 2008/0276071 A1 | * | 11/2008 | Doing | G06F 9/3804 712/205 |
| 2011/0055529 A1 | * | 3/2011 | McDonald | G06F 9/3806 712/238 |
| 2012/0324209 A1 | * | 12/2012 | Tran | G06F 9/3806 712/234 |

FOREIGN PATENT DOCUMENTS

WO    2008021607 A2    2/2008

* cited by examiner

Primary Examiner — Daniel H Pan (57) ABSTRACT

A branch instruction and a corresponding branch instruction address are received at a data processing system. A first value is received and is compared to a portion of the branch instruction address. An entry at a branch target buffer corresponding to the branch instruction is selectively allocated based on a result of the comparing.

24 Claims, 5 Drawing Sheets

| ABIT (701) | AEQ (702) | ALLOCATION PROBABILITY (%) (703) |
|---|---|---|
| 0 | X | 100 — 710 |
| 3 | 0 | 87.5 — 711 |
| 2 | 0 | 75 — 712 |
| 1 | X | 50 — 713 |
| 2 | 1 | 25 — 714 |
| 3 | 1 | 12.5 — 715 |

SYSTEM AND METHOD FOR SELECTIVELY ALLOCATING ENTRIES AT A BRANCH TARGET BUFFER

BACKGROUND

Field of the Disclosure

This disclosure relates generally to branch target buffers, and more particularly to selectively allocating entries at a branch target buffer.

Description of the Related Art

With embedded processing systems, area required by a circuit is a key metric to optimize. In doing so, generally a smaller branch target buffer is preferred to a larger one. In many cases, a small branch target buffer works fine in accelerating a majority of the branches. However, there are also instances of code where the number of branches is large and the branches are executed only once (referred to as "one and done"). In these cases, the usefulness of the branch target buffer is effectively zero when the size of the branch target buffer is less than the number of taken branches due to the constant thrashing of the branch target buffer contents.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Embodiments of systems and methods disclosed herein provide capability to regulate allocation of entries in a branch target buffer. When a branch instruction is encountered during execution of a software program at a data processing system, the system can determine whether the branch instruction, and a corresponding branch target address, is included at the branch target buffer. If the branch instruction is not presently included at the branch target buffer, the system can determine whether to allocate an entry at the branch target buffer corresponding to the branch instruction. As disclosed herein, the decision whether to allocate an entry at the branch target buffer is determined in response to comparing a selected one or more bits of the branch instruction address to a value stored at a programmable register. In one embodiment, a new entry at the branch target buffer is created for the branch instruction only if the value stored at the programmable register is equal to the value of the selected one or more bits of the branch instruction address. In another embodiment, a new entry at the branch target buffer is created for the branch instruction only if the value stored at the programmable register is not equal to the value of the selected one or more bits of the branch instruction address. In still another embodiment, the number of address bits that are evaluated when determining whether to allocate a corresponding entry at the branch target buffer can be varied. During operation, parameters at the programmable register can be adjusted to control the probability that a branch instruction will be allocated an entry at the branch target buffer. For example, if thrashing continues at the branch target buffer, the number of address bits that are compared to the branch instruction address can be adjusted, thereby reducing the probability that a branch instruction will be allocated an entry at the branch target buffer.

The disclosed techniques can provide a higher hit rate than alternative allocation algorithms. This is particularly true for branch target buffers having a relatively small number of entries and for programs that include a relatively large number of unique-taken branches. While a fewer number of branch instructions will be stored at the branch target buffer, there is a greater chance that subsequent encounters of a branch instruction will hit at the branch target buffer. In contrast, if entries at the branch target buffer are constantly overwritten with new branch instructions, there can be less chance that a particular branch instruction is still included at the branch target buffer when that branch instruction is once again encountered. The disclosed techniques can be better understood with reference to FIGS. 1-7, below.

Figure 1:
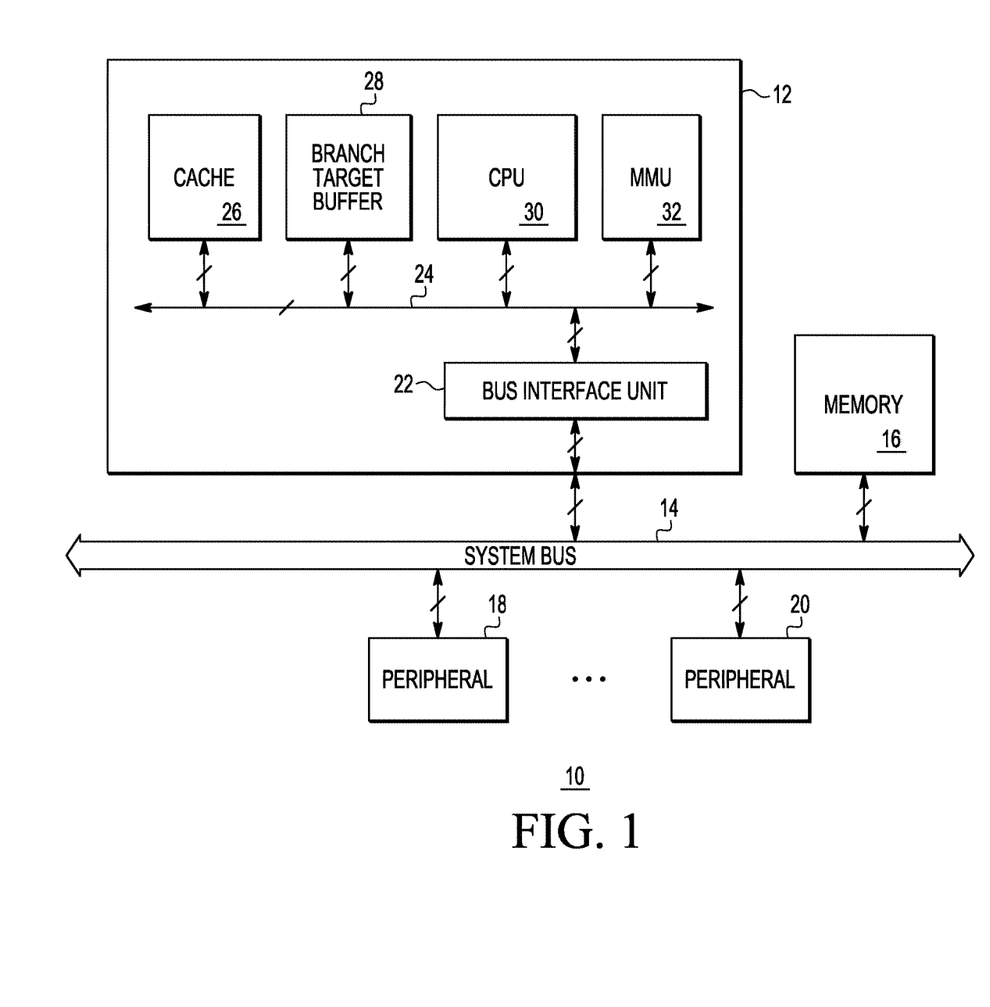
FIG. 1 illustrates in block diagram form a data processing system having a branch target buffer in accordance with one embodiment of the present disclosure.

FIG. 1 illustrates, in block diagram form, a data processing system 10 that can be used to implement various embodiments of the present disclosure. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a branch target buffer (BTB) 28, a central processing unit (CPU) 30 and a memory management unit (MMU) 32. The CPU 30 is a processor for implementing data processing operations. Each of cache 26, BTB 28, CPU 30 and MMU 32 are coupled to the internal bus via a respective input/output (I/O) port or terminal.

In operation, the processor 12 functions to implement a variety of data processing functions by executing a plurality of data processing instructions. Cache 26 is a temporary data store for frequently-used information that is needed by the CPU 30. Information needed by the CPU 30 that is not within cache 26 is stored in memory 16. The MMU 32 controls interaction of information between the CPU 30 and the cache 26 and the memory 16.

The bus interface unit 22 is only one of several interface units between the processor 12 and the system bus 14. The bus interface unit 22 functions to coordinate the flow of information related to instruction execution including branch instruction execution by the CPU 30. Control information and data resulting from the execution of a branch instruction are exchanged between the CPU 30 and the system bus 14 via the bus interface unit 22.

The BTB 28 is a buffer for storing a plurality of entries. Each of the entries corresponds to a fetch group of branch target addresses associated with branch instructions that are executed by the CPU 30. Therefore, CPU 30 selectively generates instruction addresses which are sent via the internal bus 24 to the BTB 28. The BTB 28 contains a subset of all of the possible branch instruction addresses that may be generated by CPU 30. In response to receiving an instruction address from CPU 30, the BTB 28 provides a branch target address to the CPU 30 corresponding to the branch instruction if the instruction address results in a BTB hit.

Figure 2:
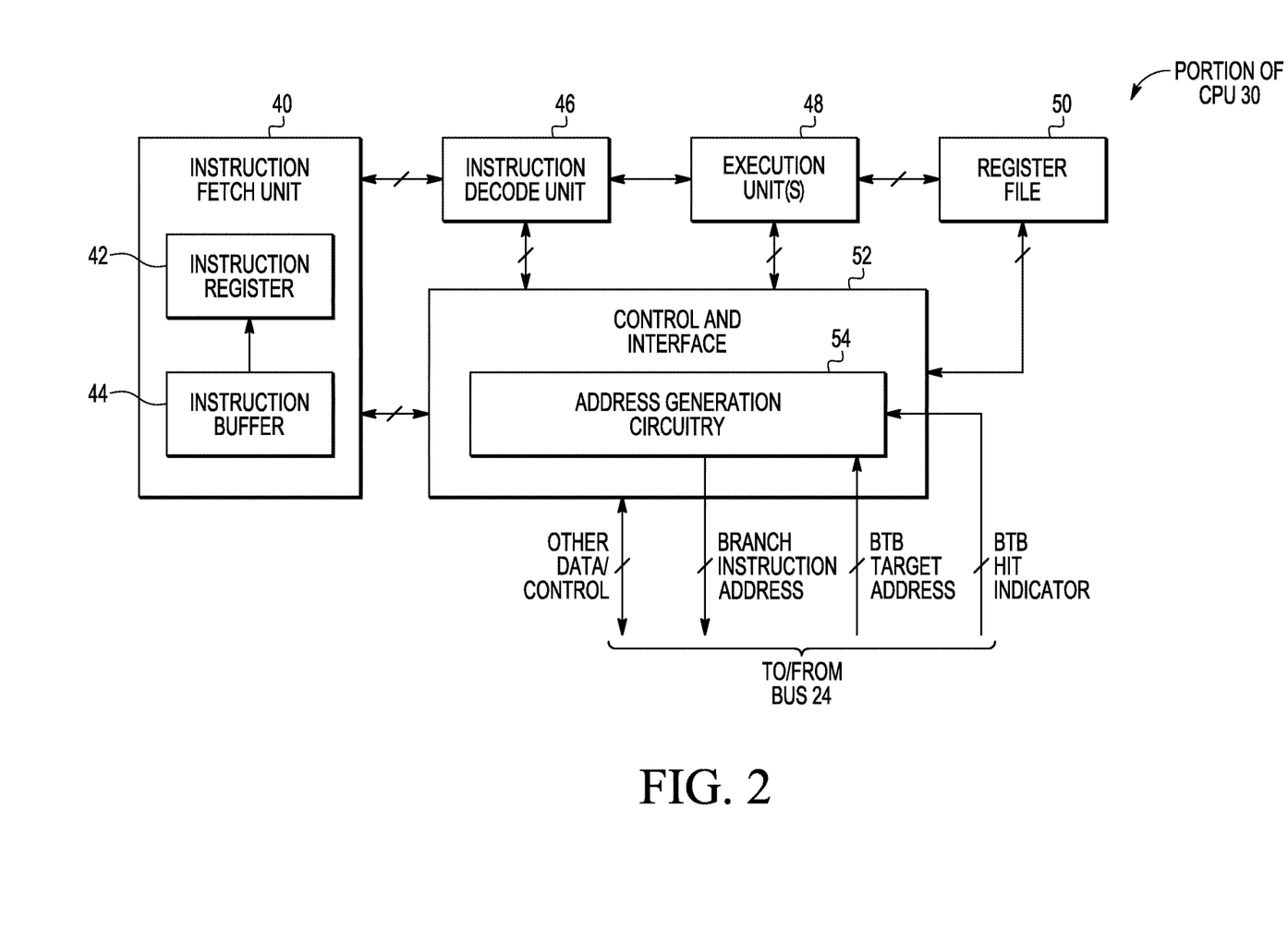
FIG. 2 illustrates in block diagram form a portion of a central processing unit (CPU) of the data processing system of FIG. 1 in accordance with one embodiment of the present disclosure.

Illustrated in FIG. 2 is a detailed portion of the CPU 30 of FIG. 1 that relates to the execution of instructions and the use of the BTB 28. An instruction fetch unit 40 is illustrated as including both an instruction buffer 44 and an instruction register 42. The instruction buffer 44 has an output that is connected to an input of the instruction register 42. A multiple conductor bidirectional bus couples a first output of the instruction fetch unit 40 to an input of an instruction decode unit 46 for decoding fetched instructions. An output of the instruction decode unit 46 is coupled via a multiple conductor bidirectional bus to one or more execution unit(s) 48. The one or more execution unit(s) 48 is coupled to a register file 50 via a multiple conductor bidirectional bus. Additionally, the instruction fetch unit 40, the instruction decode unit 46, the one or more execution unit(s) 48 and the register file 50 is coupled via separate bidirectional buses to respective input/output terminals of a control and interface unit 52 that interfaces to and from the internal bus 24.

The control and interface unit 52 has address generation circuitry 54 having a first input for receiving a BTB Hit Indicator signal via a multiple conductor bus from the branch target buffer 28 via the internal bus 24. The address generation circuitry 54 also has a second input for receiving a BTB Target Address via a multiple conductor bus from the BTB 28 via the internal bus 24. The address generation circuitry 54 has a multiple conductor output for providing a branch instruction address signal to the branch target buffer 28 via the internal bus 24. Other data and control signals can be communicated via single or multiple conductors between the control and interface unit 52 and the internal bus 24 for implementing data processing instruction execution, as required.

In the illustrated form of this portion of CPU 30, the control and interface unit 52 controls the instruction fetch unit 40 to selectively identify and implement the fetching of instructions including the fetching of groups of instructions. The instruction decode unit 46 performs instruction decoding for the one or more execution unit(s) 48. The register file 50 is used to support the one or more execution unit(s) 48. Within the control and interface unit 52 is address generation circuitry 54. The address generation circuitry 54 sends out an instruction address to the BTB 28. In response to the instruction address, a BTB target address is provided to the CPU 30 if there is a BTB hit. The BTB target address is used by CPU 30 to obtain an instruction at the target address from either cache 26 or from memory 16 if the address is not present and valid within cache 26.

Figure 3:
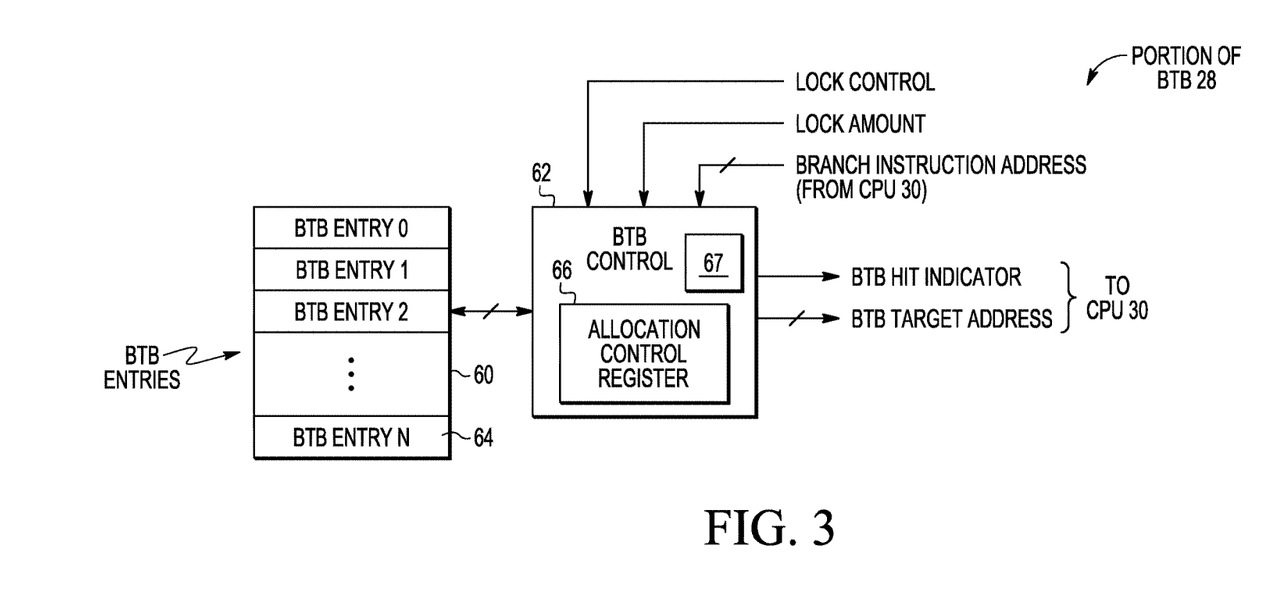
FIG. 3 illustrates in block diagram form a portion of the branch target buffer of FIG. 1 in accordance with one embodiment of the present disclosure.

Illustrated in FIG. 3 is further detail of a portion of the BTB 28. A register 60 stores (N+1) BTB entries 64 where N is an integer. The register 60 has an input/output terminal coupled to an input/output terminal of a BTB control circuit 62 via a bidirectional multiple conductor bus. The BTB control circuit 62 provides the BTB Hit Indicator and the BTB Target Address signals. The BTB control circuit 62 has inputs for receiving the instruction address from the CPU 30. BTB control circuit 62 includes an allocation control register 66 and a random number generator 67. The allocation control register 66 includes programmable fields for storing parameters that are used by the BTB control circuit 62 to determine whether an entry at the BTB 60 should be allocated for a particular branch instruction. The allocation control register 66 is described below with reference to FIG. 5.

In operation, an instruction address is received from the CPU 30. The BTB control circuit 62 determines whether the requested instruction address exists in the register 60. If so, the BTB Hit Indicator signal is asserted. In addition to asserting the BTB Hit Indicator signal, the BTB control circuit 62 retrieves the requested BTB Target Address from the correct entry and outputs the BTB Target Address to the CPU 30. If the requested branch instruction address does not exist in the register 60, the BTB Hit Indicator signal is not asserted, and the target of the branch instruction can be fetched from either cache 26 or from memory 16. If the program execution results in the branch instruction being taken, the branch instruction becomes a candidate for inclusion at the BTB 28. The BTB control circuit 62 can utilize any number of algorithms to determine when to evict or invalidate an entry at the BTB 28, and to determine when to allocate an entry at the BTB 28 for a particular branch instruction. As disclosed herein, parameters stored at the allocation control register 66 can be used to regulate allocation of entries at the BTB 28. The operation of BTB control circuit 62 is described below with reference to FIGS. 4-7.

Figure 4:
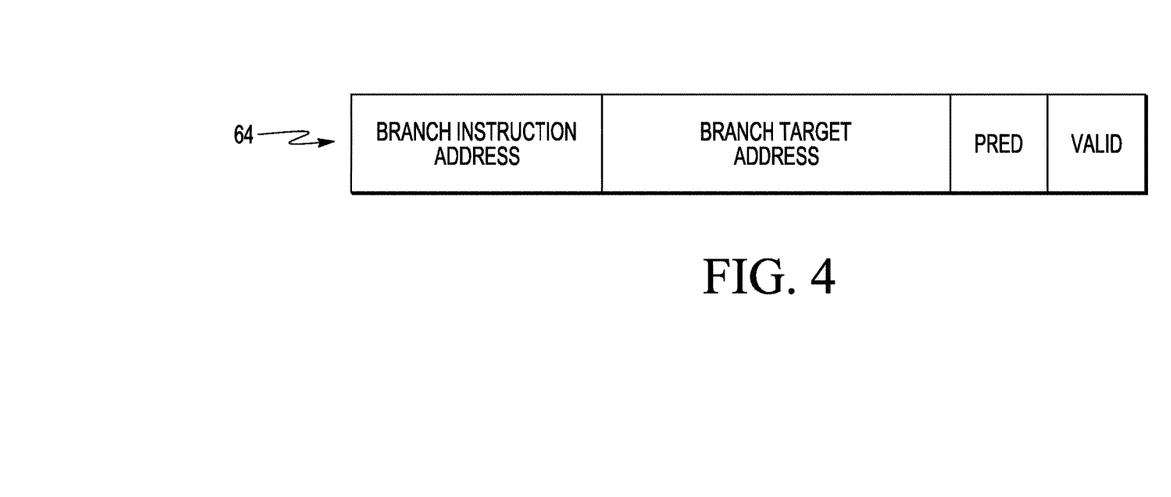
FIG. 4 illustrates in diagrammatic form a first embodiment of an entry in the branch target buffer of FIG. 1 in accordance with the present disclosure.

Illustrated in FIG. 4 is a first embodiment of a BTB entry 64 in the register 60 of FIG. 3. The entry 64 can have any suitable number of bits that are allocated in fields for a Branch Instruction Address, a Branch Target Address, a predicted (PRED) indicator, and a VALID indicator. The BTB control circuit 62 compares the Branch Instruction Address with a current instruction address provided by the CPU 30 to determine whether the current instruction address matches the branch instruction address in BTB entry 64. If there is a match, the BTB control circuit 62 then checks the VALID indicator in the entry 64 to determine if the branch target address is valid. The BTB control circuit 62 also determines whether the valid branch target address is predicted to be taken using the PRED indicator in the entry 64. If the PRED indicator indicates the valid branch target address is predicted to be taken, then the BTB control circuit 62 asserts the BTB Hit Indicator signal. If not, the BTB Hit Indicator signal is not asserted.

Figure 5:
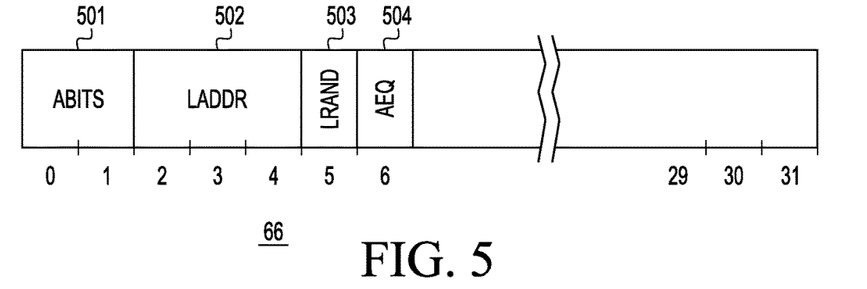
FIG. 5 illustrates in diagrammatic the allocation control register of FIG. 3 according to a specific embodiment of the present disclosure.

FIG. 5 illustrates the allocation control register 66 of FIG. 3 according to a specific embodiment of the present disclosure. The BTB control circuit 62 can compare a value stored at the allocation control register 66 with one or more low-order bits of a branch instruction address and determine whether to allocate an entry at the register 60 of the BTB 28 based on the comparison. The allocation control register 66 includes a field 501 for storing a value ABITS, a field 502 for storing a value LADDR, a field 503 for storing an indicator LRAND, and a field 504 for storing an indicator AEQ. The allocation control register can be a stand-alone register, or the fields 501-504 can be incorporated at an existing register, for example at a branch unit control and status register (BUCSR) of a Power-PC processor.

Field 501 can include two binary bits and a value stored therein is used by the BTB control circuit 62 to determine how many bits of the value stored at the LADDR field 502 are considered valid. The parameter ABITS can be assigned a value of binary 00, 01, 10, and 11. The parameter LADDR at field 502 can include three binary bits. A value stored at the LADDR field 502 is interpreted based on the value ABITS. For example, if ABITS=01, only the least-significant bit, bit 4, of the value LADDR is compared to one low-order bit of a branch instruction address. Similarly, if ABITS=10, the least-significant two bits, bits 3 and 4, of the value LADDR are compared. If ABITS=11, the least-significant three bits, bits 2-4, of the value LADDR are compared. If ABITS=00, the value LADDR does not affect allocation at the BTB 28.

The low-order bits of the branch instruction address that are compared to corresponding bits of the LADDR value are selected based on a size of the branch instruction. If the data processing system 10 includes instructions having thirty-two bits, the least significant two bits of the instruction address are ignored. If the instructions include sixteen bits, only the least significant bit of the address is ignored. For example, if the system 10 includes thirty-two bit instructions, wherein the least significant bit of an instruction is designated bit thirty-one and the most significant bit of the instruction is designated bit zero, address bits thirty and thirty-one are ignored and the BTB control circuit 62 compares bits of the branch target address starting at bit twenty-nine to selected bits of the value LADDR.

The indicator LRAND can be asserted by storing a value of binary 1 at the field 503, which causes the BTB control circuit 62, and the random number generator 67 in particular, to generate a random value that is matched to low-order bits of a branch instruction address instead of a value stored at LADDR field 502. Conversely, a value of binary 0 can be stored at the field 503 to indicate that a value stored at LADDR field 502 should be used to determine whether a branch instruction can be allocated at the BTB 28. In an embodiment, a multiplexer (not shown at FIG. 3) can select either a value stored at LADDR field 502 or a random value generated by random number generator 67 based on the value of indicator LRAND.

The indicator AEQ can be asserted by storing a value of binary 1 at the field 504, and negated by storing a value of binary 0 at the field 504. If AEQ is asserted, the value stored at LADDR field 502 is compared to low order bits of a branch instruction address and if respective bits match, an entry at the BTB 28 can be allocated for the branch instruction. If AEQ is negated, an entry at the BTB 28 can be allocated for the branch instruction if the low order bits of the branch instruction address do not match the value specified by LADDR. The size of any of fields 501-504 can be different than shown at FIG. 5 without departing from the scope of the present disclosure.

Figure 6:
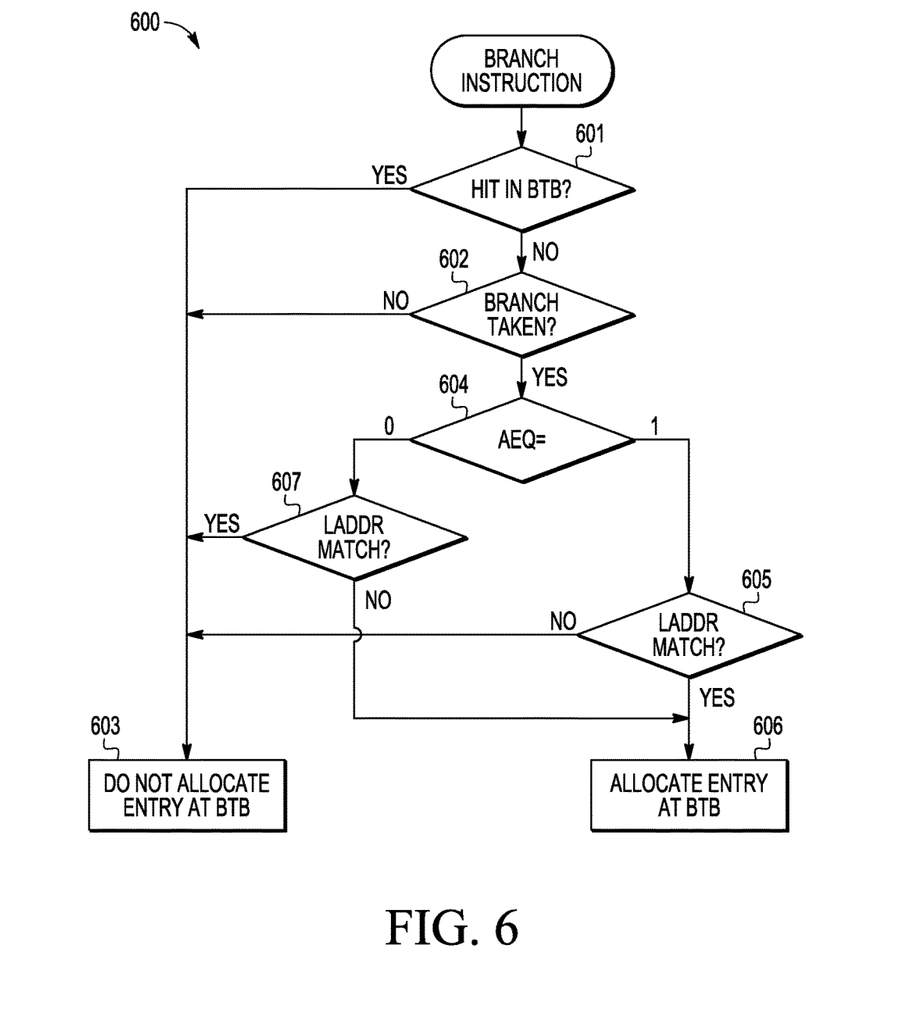
FIG. 6 is a flow diagram illustrating a method according to one or more embodiments of the present disclosure.

FIG. 6 is a flow diagram illustrating operation of the BTB control circuit 62 and the allocation control register 66 in response to execution of a branch instruction, according to a specific embodiment of the present disclosure. The method begins at block 601 where it is determined whether the branch instruction hits (for example, is included) at the branch target buffer. If the branch instruction is already associated with an entry at the BTB 28, there is no need to allocate a new entry and the flow proceeds to block 603, and the method is complete for this particular branch instruction. If, however, the current branch instruction is not included at the branch target buffer, the method proceeds to block 602 where it is determined whether the branch was taken. For example, if execution of a conditional branch instruction results in branching of instruction flow to the target of the branch instruction, the branch is said to have been taken. If the branch is not taken, the flow proceeds to block 603 and no entry is allocated for the current branch instruction. If the branch is taken, the flow proceeds to block 604.

At block 604 it is determined whether the indicator AEQ is asserted. If the indicator AEQ is asserted, the flow proceeds to block 605 where a portion of the value LADDR specified by the value ABITS is compared to a corresponding portion of the low-order bits of the branch instruction address. At block 605 if the selected bits of the value LADDR match the corresponding bits of the branch instruction address, the flow proceeds to block 606 where an entry at the branch target buffer 28 is allocated corresponding to the current branch instruction. If, however, the selected bits of the value LADDR do not match the corresponding bits of the branch instruction address, the flow proceeds to block 603 and no entry is allocated. Returning to block 604, if the indicator AEQ is not asserted, the flow proceeds to block 607 where a portion of the value LADDR specified by the value ABITS is compared to a corresponding portion of low-order bits of the branch instruction address. If the selected bits of the value LADDR do not match the corresponding bits of the branch instruction address, the flow proceeds to block 606 where an entry at the branch target buffer 28 is allocated corresponding to the current branch instruction. If, however, the selected bits of the value LADDR do match the corresponding bits of the branch instruction address, the flow proceeds to block 603 and no entry is allocated.

Figure 7:
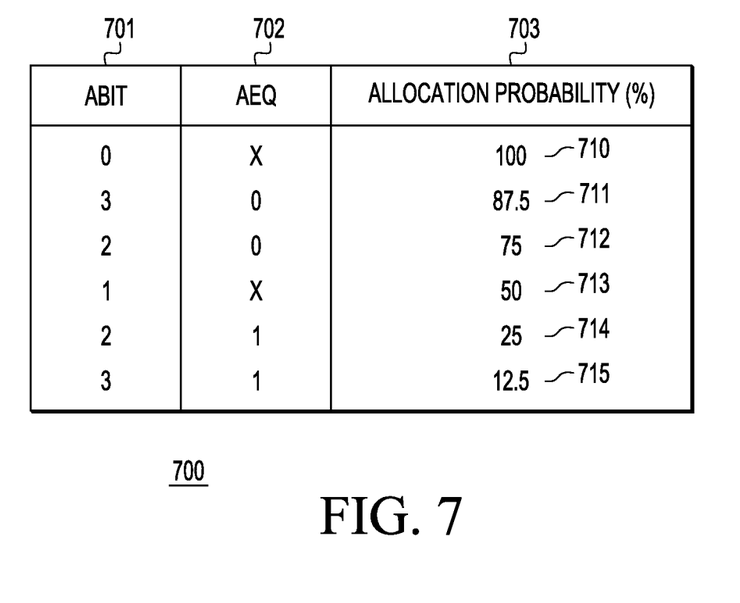
FIG. 7 is a table illustrating operation of the branch target buffer control circuit of FIG. 3 according to a specific embodiment of the present disclosure.

FIG. 7 is a table 700 illustrating how the disclosed techniques can be used to regulate allocation of entries at a branch target buffer according to a specific embodiment of the present disclosure. The table 700 includes columns 701, 702, and 703, and rows 710, 711, 712, 713, 714, and 715. The table 700 is sorted based on the allocation probability of column 703. Each row illustrates how particular combinations of values of the parameter ABIT and the indicator AEQ can provide a corresponding probability of allocating an entry at the branch target buffer 28. At row 710, the value ABIT is decimal zero. Accordingly, no bits of the value LADDR are valid, and the techniques disclosed herein have no impact on the likelihood of allocating an entry because no bits of the branch instruction address are compared to the value LADDR. Accordingly, the value of AEQ is irrelevant. Jumping to row 713, the value of ABIT is decimal one, so only the least significant bit of the value LADDR is compared to a corresponding bit of the branch instruction address. Assuming an even distribution of addresses, one out of two branch instruction addresses will include a low-order bit that matches the one valid bit of a value LADDR because the one low-order bit of the instruction address is either zero or one. Once again, the value of AEQ is irrelevant. Therefore, the allocation probability is one-half, or fifty percent.

At row 711, the value of ABIT is decimal three and AEQ is negated. On average, only one out of eight branch instruction addresses will include low-order bits that match the three valid bits of a particular value of LADDR. However, because indicator AEQ is negated, there is a seven out of eight chance that the branch instruction addresses will include low-order bits that do not match the three valid bits of a particular value of LADDR. Therefore, the contribution towards allocation from the techniques disclosed herein is seven-eighths, or 87.5 percent. At row 712, the value of ABIT is decimal two and indicator AEQ is negated. On average, only one out of four branch instruction addresses will include low-order bits that match the two valid bits of a particular value of LADDR. However, because AEQ is negated, there is a three out of four chance that the branch instruction addresses will include low-order bits that do not match the three valid bits of a particular value of LADDR. Therefore, the contribution towards allocation from the techniques disclosed herein is three-quarters, or 75 percent.

At row 714, the value of parameter ABIT is decimal two and indicator AEQ is asserted. Therefore, the contribution towards allocation from the techniques disclosed herein is one-quarter, or 25 percent. At row 715, the value of parameter ABIT is decimal three and indicator AEQ is asserted. Therefore, the contribution towards allocation from the techniques disclosed herein is one-eighth, or 12.5 percent. The values ABIT, AEQ, and LADDR can be modified dynamically during operation of the data processing device 10 based on an observed effectiveness of the branch target buffer 28. For example, if program code being executed includes a large number of unique-taken branch instructions, entries at the branch target buffer 28 may be evicted and re-allocated to new branch instructions at too high a rate. In this situation, an entry at the buffer 28 may be evicted before the corresponding branch instruction is once again encountered, thereby resulting in a buffer miss. Accordingly, an operating system or a system monitoring program can modify the present values of ABIT, AEQ, and LADDR to decrease the rate at which new entries are allocated, and thereby increase the likelihood that the particular branch instruction will still be present at the buffer 28 when the instruction is executed once again.

One of skill will understand that the data processing system 10 can utilize multiple allocation, prediction, and eviction algorithms that can operate in parallel. Therefore, allocation probability values of column 703 can reflect only a contributing effect of the disclosed techniques.

In a first aspect a data processing system includes a processor to execute processor instruction, and a branch target buffer having a plurality of entries, each entry to store a branch instruction address and a corresponding branch target address. The system also includes control circuitry to selectively allocate an entry at the branch target buffer to a first branch instruction based on comparing a first value to a portion of a branch instruction address of the first branch instruction. In one embodiment of the first aspect, the control circuitry is further to determine whether to allocate the entry based on determining the first value is equal to a value represented by the portion of the branch instruction address. In another embodiment of the first aspect, the control circuitry is further to determine whether to allocate the entry based on determining the first value is not equal to a value represented by the portion of the branch instruction address. In yet another embodiment of the first aspect, the control circuitry is further to determine whether to allocate the entry based on a stored value, the stored value indicating a number of bits to represent the first value.

In still another embodiment of the first aspect, the control circuitry is further to compare the first value and the portion of a branch instruction address for equality or for inequality based on an indicator. In another embodiment of the first aspect, the system includes a control register including a randomize indicator. Assertion of the randomize indicator causes the control circuitry to generate the first value. In a further embodiment of the first aspect, the system includes programmable storage circuitry to store the first value and to store a second value specifying a number of bits to represent the first value. In still a further embodiment of the first aspect, the first value and the portion of the branch instruction address each includes four or fewer bits.

In a second aspect, a method includes receiving a branch instruction and a corresponding branch instruction address. A first value is also received. The method further includes comparing the first value to a portion of the branch instruction address, and selectively allocating an entry at a branch target buffer corresponding to the branch instruction address based on a result of the comparing. In one embodiment of the second aspect, comparing includes determining the first value is equal to the portion of the branch instruction address. In another embodiment of the second aspect, comparing includes determining the first value is not equal to the portion of the branch instruction address. In yet another embodiment of the second aspect, comparing further includes comparing a predetermined number of bits of the first value to the portion of the branch instruction address. In still another embodiment of the second aspect, comparing further includes comparing for equality or comparing for inequality based on an indicator. In a further embodiment of the second aspect, the first value is a random value generated in response to assertion of an indicator. In still a further embodiment of the second aspect, the method includes receiving the first value from a storage location, the storage location being programmable. In another embodiment of the second aspect, the first value and the portion of the branch instruction address each includes four or fewer bits.

In a third aspect, a branch target buffer includes a plurality of entries, each entry including storage locations to store a branch instruction address and a branch target address corresponding to the branch instruction. The buffer also includes an allocation control register to store a first value, and control circuitry to selectively allocate a first entry of the plurality of entries to a first branch instruction in response to comparing the first value to a portion of an instruction address of the first branch instruction. In one embodiment of the third aspect, the allocation control register further includes an indicator, and comparing further includes comparing for equality or comparing for inequality based on the indicator. In another embodiment of the third aspect, the allocation control register further includes a second value, the second value indicating a number of bits of the first value to compare with the portion of the branch instruction address. In yet another embodiment of the third aspect, the allocation control register further includes an indicator, and the first value is a random value generated in response to assertion of an indicator.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A data processing system, comprising:
   a processor to execute processor instructions;
   a branch target buffer having a plurality of entries, each entry to store a branch instruction address and a corresponding branch target address;
   programmable storage circuitry to store a first value, the programmable storage circuitry distinct from the plurality of entries of the branch target buffer; and
   control circuitry to determine whether to create an entry at the branch target buffer corresponding to a first branch instruction based on comparing the first value to a portion of a branch instruction address of the first branch instruction, wherein the control circuitry is further configured to compare the first value and the portion of a branch instruction address for equality in response to one or more indicator control bits stored in a control register of the programmable storage circuitry having a first value and for inequality in response to the one or more indicator control bits having a second value.

2. A data processing system, comprising:
   a processor to execute processor instructions;
   a branch target buffer having a plurality of entries, each entry to store a branch instruction address and a corresponding branch target address;
   programmable storage circuitry to store a first value, the programmable storage circuitry distinct from the plurality of entries of the branch target buffer; and
   control circuitry to determine whether to create an entry at the branch target buffer corresponding to a first branch instruction based on comparing the first value to a portion of a branch instruction address of the first branch instruction and one or more indicator control bits stored in a control register of the programmable control storage circuitry,
   wherein determining whether to create an entry at the branch target buffer corresponding to the first branch instruction based on comparing the first value to the portion of the branch instruction address of the first branch instruction further comprises creating the entry based on determining the first value is equal to a value represented by the portion of the branch instruction address when the one or more indicator control bits have a first indicator value and based on determining that the branch target buffer does not include an existing entry corresponding to the first branch instruction.

3. The system of claim 1, wherein the control register includes a randomize indicator, wherein assertion of the randomize indicator causes the control circuitry to generate the first value.

4. The system of claim 1, wherein the programmable storage circuitry is further to store a second value specifying a number of bits to represent the first value.

5. The system of claim 1, wherein the first value and the portion of the branch instruction address each includes four or fewer bits.

6. The system of claim 2, wherein determining whether to create an entry at the branch target buffer corresponding to the first branch instruction based on comparing the first value to the portion of the branch instruction address of the first branch instruction further comprises creating the entry based on determining the first value is not equal to a value represented by the portion of the branch instruction address when the one or more indicator control bits have a second indicator value and based on determining that the branch target buffer does not include an existing entry corresponding to the first branch instruction.

7. The system of claim 6, wherein the control register includes a randomize indicator at the programmable storage circuitry, wherein assertion of the randomize indicator causes the control circuitry to generate the first value.

8. The system of claim 6, wherein the programmable storage circuitry is further to store a second value specifying a number of bits to represent the first value.

9. The system of claim 6, wherein the first value and the portion of the branch instruction address each includes four or fewer bits.

10. A method comprising:
    receiving, by a processor, a branch instruction and a corresponding branch instruction address;
    receiving at control circuitry a first value stored in programmable storage circuitry;
    comparing, by the control circuitry, the first value to a portion of the branch instruction address; and
    determining, by the control circuitry, whether to create an entry at a branch target buffer corresponding to the branch instruction based on a result of the comparing and one or more indicator control bits stored in a control register of the programmable control storage circuitry,
    wherein determining whether to create an entry at the branch target buffer corresponding to the branch instruction based on a result of the comparing and the one or more indicator control bits further comprises creating the entry in response to determining the first value is not equal to the portion of the branch instruction address when the one or more indicator control bits have a first indicator value and based on determining that the branch target buffer does not include an existing entry corresponding to the branch instruction.

11. The method of claim 10, wherein determining whether to create an entry at the branch target buffer corresponding to the branch instruction based on a result of the comparing further comprises creating the entry in response to determining the first value is equal to the portion of the branch instruction address when the one or more indicator control bits have a second indicator value and based on determining that the branch target buffer does not include an existing entry corresponding to the branch instruction.

12. The method of claim 10, wherein comparing further comprises comparing a predetermined number of bits of the first value to the portion of the branch instruction address, the number of bits specified by a second value at the programmable storage circuitry.

13. The method of claim 10, wherein the first value is a random value generated in response to assertion of randomize indicator at the programmable storage location.

14. The method of claim 10, wherein the first value and the portion of the branch instruction address each includes four or fewer bits.

15. The method of claim 10, wherein the programmable storage circuitry is distinct from the plurality of entries.

16. A method comprising:
receiving, by a processor, a branch instruction and a corresponding branch instruction address;
receiving at control circuitry a first value stored in a programmable storage circuitry;
comparing, by the control circuitry, the first value to a portion of the branch instruction address; and
determining, by the control circuitry, whether to create an entry at a branch target buffer corresponding to the branch instruction based on a result of the comparing, wherein comparing further comprises comparing for equality in response to one or more indicator control bits stored in a control register of the programmable storage circuitry having a first value or comparing for inequality in response to the one or more indicator control bits having a second value.

17. The method of claim 16, wherein comparing further comprises comparing a predetermined number of bits of the first value to the portion of the branch instruction address, the number of bits specified by a second value at the programmable storage circuitry.

18. The method of claim 16, wherein the first value is a random value generated in response to assertion of a randomize indicator at the programmable storage circuitry.

19. The method of claim 16, wherein the first value and the portion of the branch instruction address each includes four or fewer bits.

20. The method of claim 16, wherein the programmable storage circuitry is distinct from the plurality of entries.

21. A branch target buffer, comprising:
a plurality of entries, each entry including storage locations to store a branch instruction address and a branch target address corresponding to the branch instruction;
an allocation control register to store a first value; and
control circuitry to determine whether to create a first entry of the plurality of entries corresponding to a first branch instruction in response to comparing the first value from said allocation control register to a portion of an instruction address of the first branch instruction, wherein the allocation control register further includes one or more indicator control bits, and wherein comparing further comprises comparing for equality in response to the one or more indicator control bits having a first value or comparing for inequality in response to the one or more indicator control bits having a second value.

22. The branch target buffer of claim 21, wherein the allocation control register further includes a second value, the second value indicating a number of bits of the first value to compare with the portion of the branch instruction address.

23. The branch target buffer of claim 21, wherein the allocation control register further includes a randomized control bit, and wherein the first value is a random value generated in response to assertion of the randomized control bit.

24. The branch target buffer of claim 21, wherein the allocation control register is distinct from the plurality of entries.

* * * * *